(12) United States Patent
Averbuch et al.

(10) Patent No.: US 8,489,715 B2
(45) Date of Patent: Jul. 16, 2013

(54) IDENTIFYING AND DOWNLOADING AN APPLICATION ASSOCIATED WITH A SERVICE REGISTERED IN A HOME NETWORK

(75) Inventors: Aaron Hyman Averbuch, Seattle, WA (US); John Furlan, Belmont, CA (US); Matthew Tebbs, Seattle, WA (US); Ariel Braunstein, San Francisco, CA (US); John-Anthony Owens, Seattle, WA (US); Rodney David Smith, Issaquah, WA (US); Mark Carroll, Saratoga, CA (US); Thomas E. Logan, Bothell, WA (US); Daniel Richard Albertson, Issaquah, WA (US); Alan Scott Pearson, Seattle, WA (US)

(73) Assignee: CISCO Technology, Inc., San Jose, CA (US)

( * ) Notice: Subject to any disclaimer, the term of this patent is extended or adjusted under 35 U.S.C. 154(b) by 76 days.

(21) Appl. No.: 13/172,615

(22) Filed: Jun. 29, 2011

(65) Prior Publication Data

US 2013/0007098 A1 Jan. 3, 2013

(51) Int. Cl.
*G06F 15/177* (2006.01)
(52) U.S. Cl.
USPC .......................................................... 709/220

(58) Field of Classification Search
USPC .................................. 709/220–223; 340/4.41
See application file for complete search history.

(56) References Cited

U.S. PATENT DOCUMENTS

| 5,919,247 | A * | 7/1999 | Van Hoff et al. .............. 709/217 |
| 7,260,597 | B1 * | 8/2007 | Hofrichter et al. ........... 709/200 |
| 7,359,933 | B1 * | 4/2008 | Polen et al. ................... 709/203 |
| 8,108,898 | B2 * | 1/2012 | Hofrichter et al. .............. 725/50 |
| 2004/0025173 | A1 * | 2/2004 | Levonai et al. ............... 719/328 |

* cited by examiner

*Primary Examiner* — Lance L Barry
(74) *Attorney, Agent, or Firm* — Patterson & Sheridan LLP

(57) ABSTRACT

One embodiment of the present invention sets forth a method for interacting with one or more client devices coupled to a smart network host device within a smart home network. The method includes the steps of identifying a first application that is associated with at least one client device and stored in an first application store coupled to a smart home network, downloading the first application from the first application store for execution, associating a service that is exposed by the at least one client device with the first application, translating a high-level instruction generated by the first application via the service to a low-level instruction that is understood by the at least one client device, and transmitting the low-level instruction to the at least one client device for processing.

19 Claims, 8 Drawing Sheets

IDENTIFYING AND DOWNLOADING AN APPLICATION ASSOCIATED WITH A SERVICE REGISTERED IN A HOME NETWORK

BACKGROUND OF THE INVENTION

1. Field of the Invention

The present invention relates generally to home wireless networking.

2. Description of the Related Art

A home network is used to provide Internet connectivity and data sharing among computing devices within a home that are connected to that network. To allow computing devices to be placed remotely from one another and/or from the network router, many home networks are fully or partially wireless. Wireless home networks typically include a wireless router that is hard wired to a modem. The modem, which is often provided by a telephone or cable company, is connected to an external network, such as the Internet, and allows information to flow between the external network and the home network. Each computing device in the home network is connected to the wireless router through a wireless network adapter that is either internal or external to the computing device.

Computing devices in the home network typically need to be configured via device drivers so that they operate as desired. Typically, such device drivers are packaged per computing device and are large monolithic pieces of software that need to be independently tracked by the user configuring the computing devices. In addition, vendors of the computing devices may provide additional software applications that expose extra functionality built on top of the client devices. Such additional software applications are also packaged per computing device and managed by the user separately.

One drawback to such a mechanism of application and driver distribution is that the user has to individually download and track the different applications and drivers related to the computing devices within the home network. In addition, the user has to manually check for updates to those applications/drivers as they become available. Such a mechanism requires the user to be heavily involved in managing the applications/drivers related to the home network, which is undesirable from a usability perspective. In addition, because the user selects the various applications that are to be downloaded, the user may not be downloading the most optimal or feature-rich applications for the particular home network.

As the foregoing illustrates, what is needed in the art is a more efficient and effective mechanism for distributing software applications related to computing devices within the home network.

BRIEF DESCRIPTION OF THE DRAWINGS

So that the manner in which the features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

DETAILED DESCRIPTION

Figure 1A:
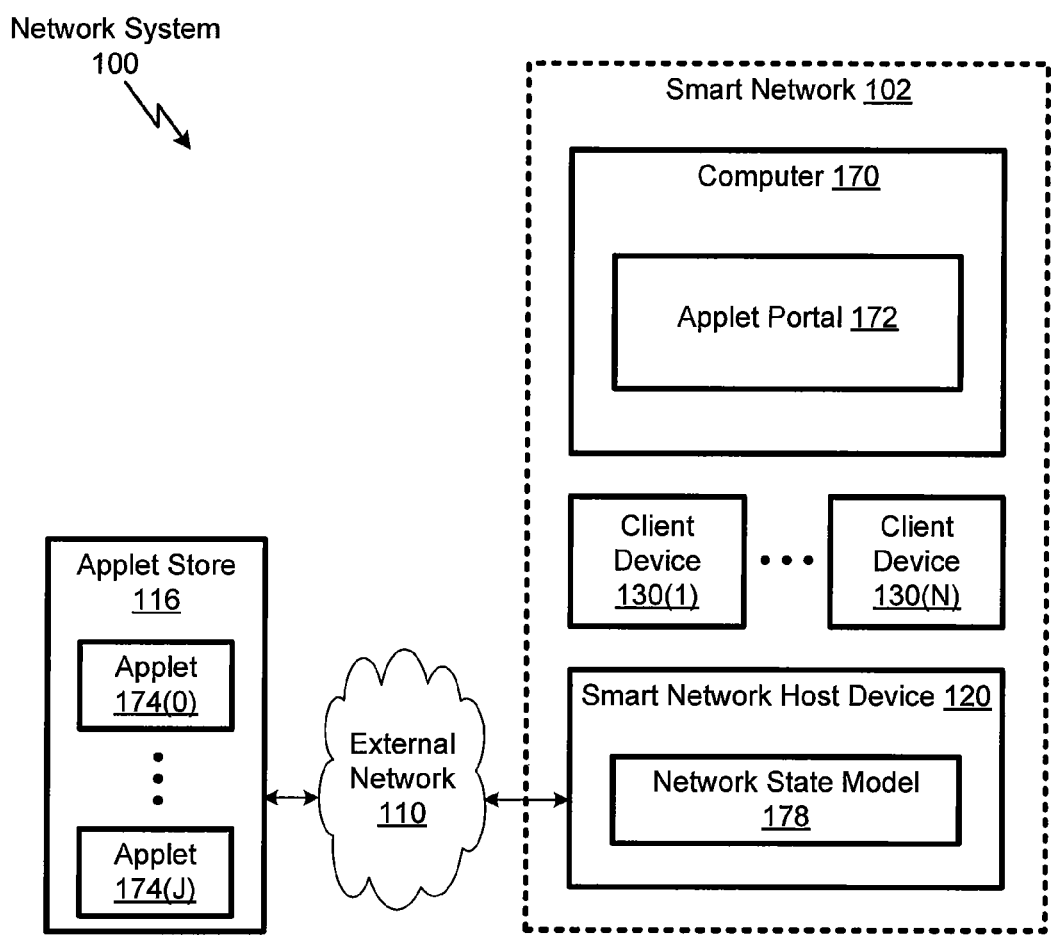
FIG. 1A is an exemplary illustration of an overarching network system configured to implement one or more aspects of the present invention.

FIG. 1A illustrates a network system 100, configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

An applet portal application 172, residing within the computer 170, is configured to access the network state model 178 to determine which client devices 130 are available within the smart network 102, which services the client devices 130 provide, and to access and use the services. The applet portal application 172 may download one or more applets 174, configured to extend functionality of the applet portal application 172, from the applet store 116. A given applet 174 may be associated with a specific client device 130 and may facilitate specific usage models for the client device 130 via the extended functionality. When a new client device 130 registers with the smart network 102, a most recent version of a corresponding applet 174 may not be available within the applet portal application 172. However, the applet portal application 172 may retrieve the corresponding applet 174 or version of the corresponding applet 174 from the applet store 116.

The applet store 116 is configured to facilitate access to applets 174 by the applet portal application 172. The applet store 116 provides storage for applets 174 corresponding to client devices 130 and makes the applets 174 available for download to the applet portal application 172 via the external network 110. In one embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 an incorporate the functionality of the applet 174 to the portal 172.

Figure 1B:
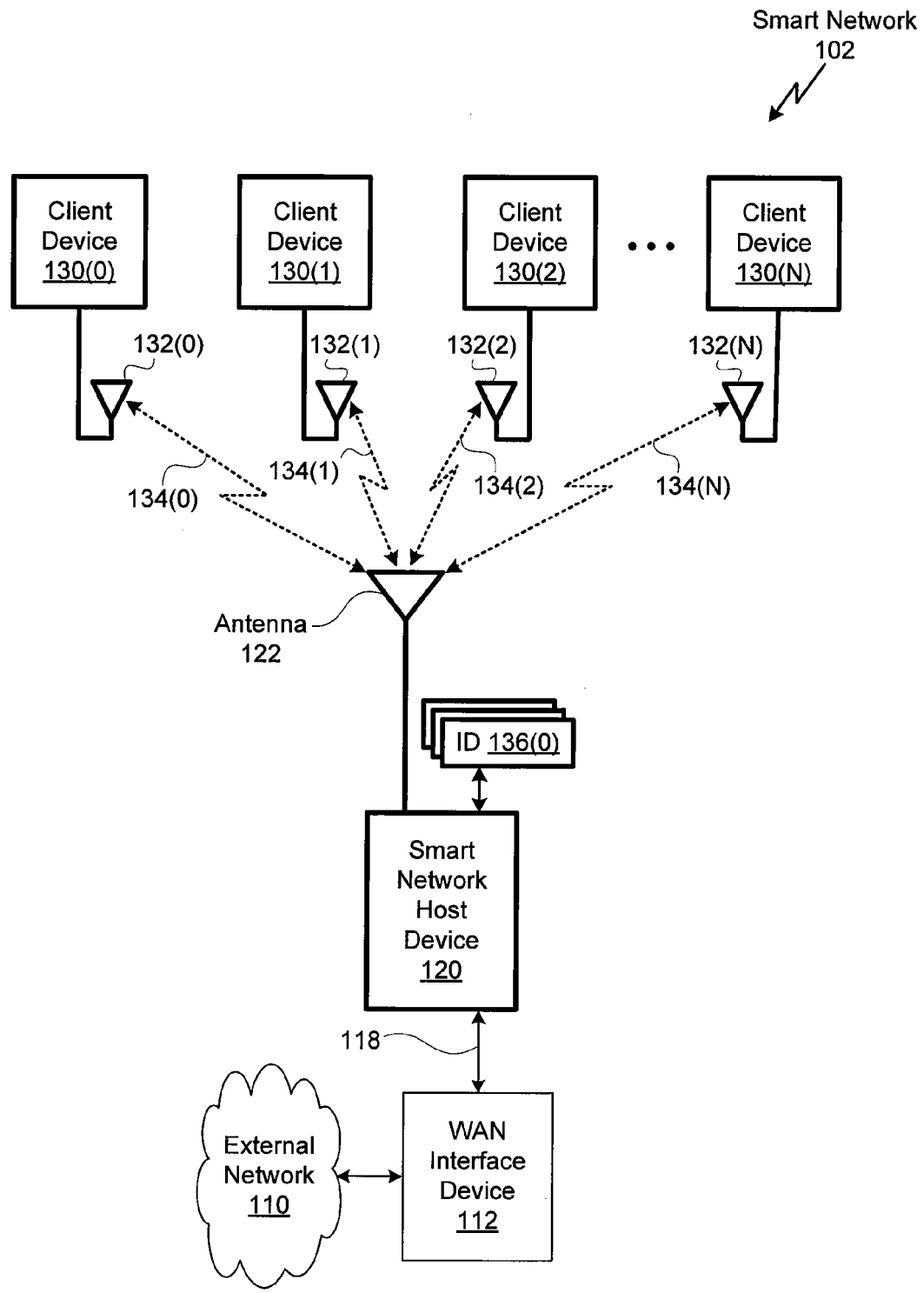
FIG. 1B illustrates the smart home network of FIG. 1A, according to one example embodiment of the present invention.

FIG. 1B illustrates the smart network 102, according to one embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one embodiment, the wireless network interface implements one or more well-known standards, such as the Institute of Electrical and Electronics Engineers (IEEE) standard 802.11, which defines a system for wireless local area networking. The antenna 122 is configured establish wireless client links 134 to antennas 132 coupled to corresponding client devices 130. The smart network host device 120 implements Ethernet layer 2 switching for wireless data packets forwarded among client devices 130 as well as internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one embodiment, authentication is implemented via Identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. In alternative embodiments, other forms of ID devices 136 may implement storage of the authentication credentials. For example, a universal serial bus (USB) storage device may be used to present authentication credentials to the smart network host device 120 for authenticating a related device, such as the computer 170. In an alternative embodiments, a user may manually authenticate a client device 130 with the smart network host device 120. For example, the user may log onto a management web page generated by the smart network host device 120 and manually enter authentication credentials, such as a printed code associated with the client device 130. In yet another alternative embodiment, the device ID is communicated using a bar-code or QR code which is scanned by a camera attached to a host computer or built into the Smart Network Host Device 120.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is the able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
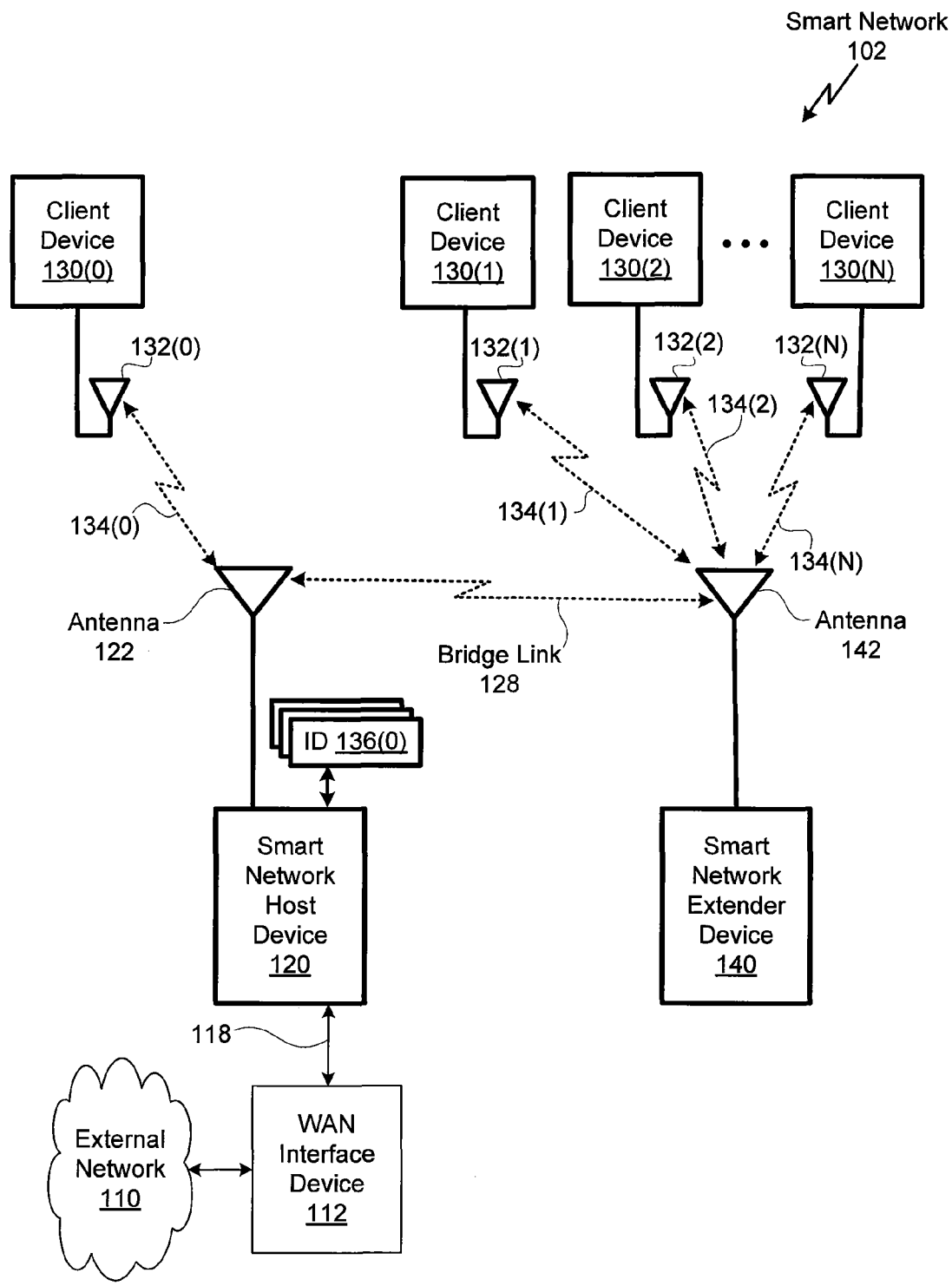
FIG. 1C illustrates the smart home network of FIG. 1A, according to another example embodiment of the present invention.

FIG. 1C illustrates the smart network 102, according to another embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network-host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one embodiment, each smart network extender device 140 is paired to an ID device 136, which is presented as an authentication credential to the smart network host device 120 to enable the smart network extender device 140 to participate within the smart network 102.

Figure 1D:
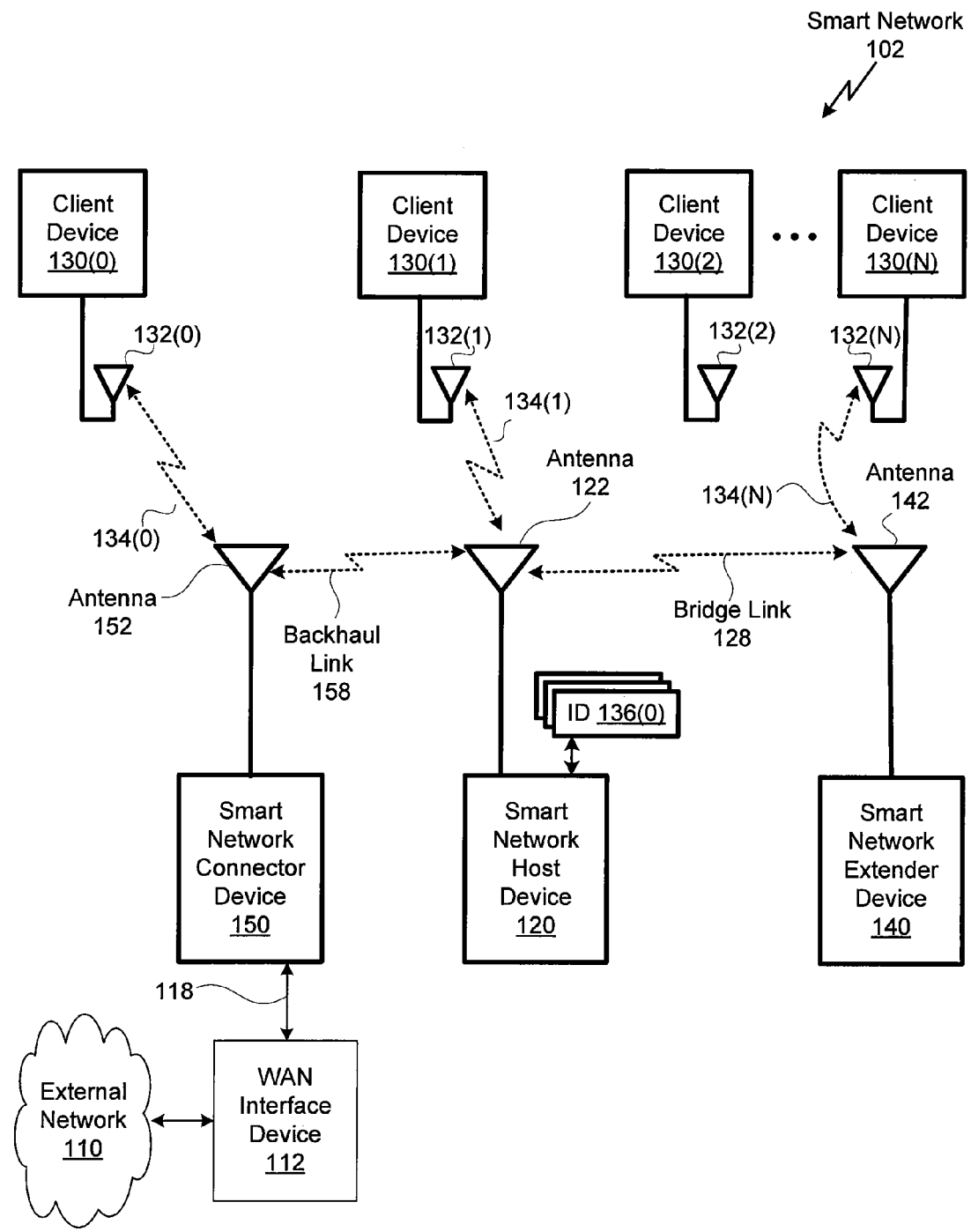
FIG. 1D illustrates the smart home network of FIG. 1A, according to yet another example embodiment of the present invention.

FIG. 1D illustrates the smart network 102, according to yet another embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one embodiment, the smart network connector device 150 is paired to an ID device 136, which is presented as an authentication credential to the smart network host device 120 to enable the smart network connector device 150 to participate within the smart network 102. In an alternative embodiment, the smart network connector device 150 and the smart network host device 120 are paired during a manufacturing step, eliminating the need for a separate ID device 136.

Figure 1E:
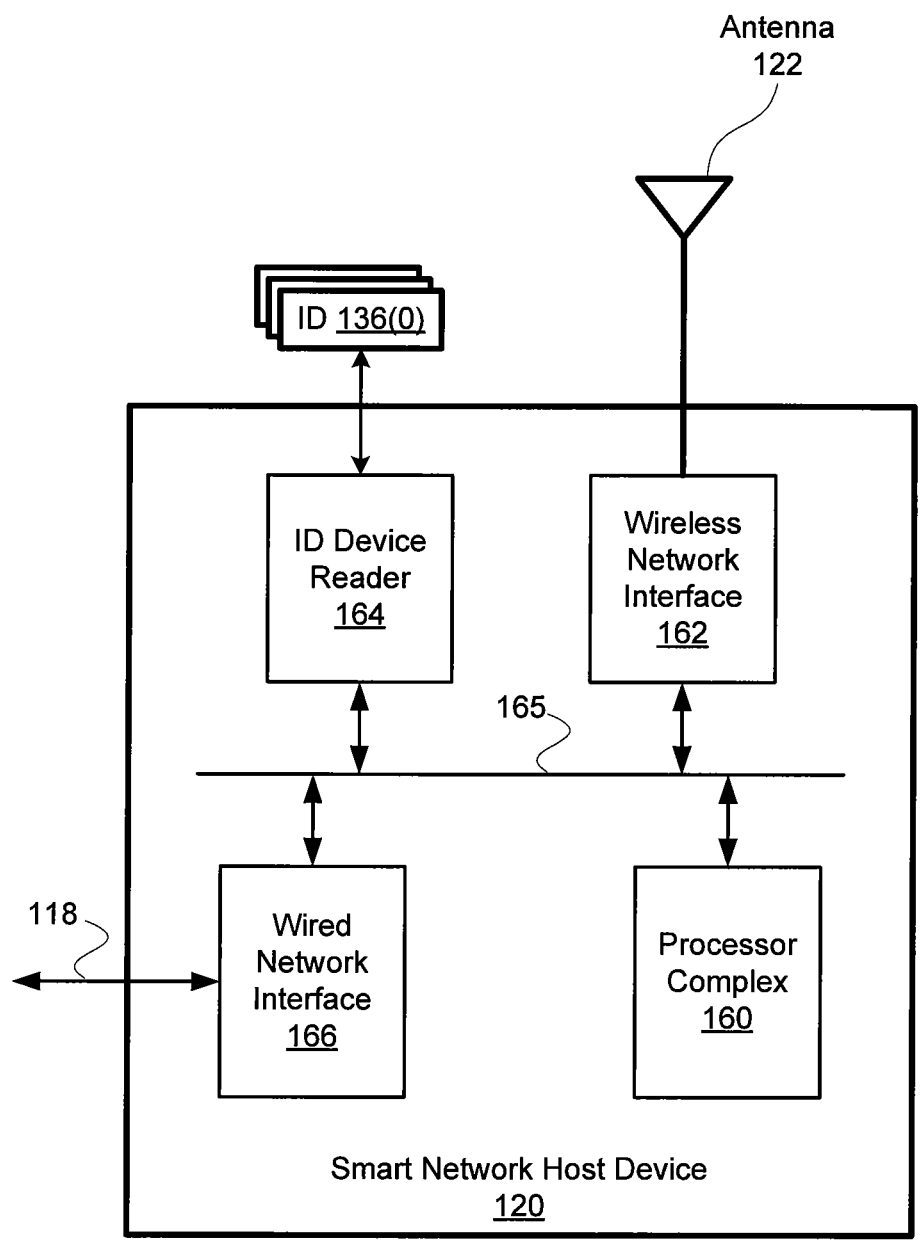
FIG. 1E is a more detailed illustration of the smart network host device of FIG. 1A, according to one example embodiment of the present invention.

FIG. 1E is a more detailed illustration of the smart network host device 120, according to one embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one embodiment, the ID device reader 164 is configured to read data from RFID tags comprising the ID device 136. The ID device reader 164 may also include a USB reader. In an alternative embodiment, ID device reader 164 is a camera and the ID is encoded into a bar-code or QR code which can be physically printed on the device or on the device's packaging.

In certain embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
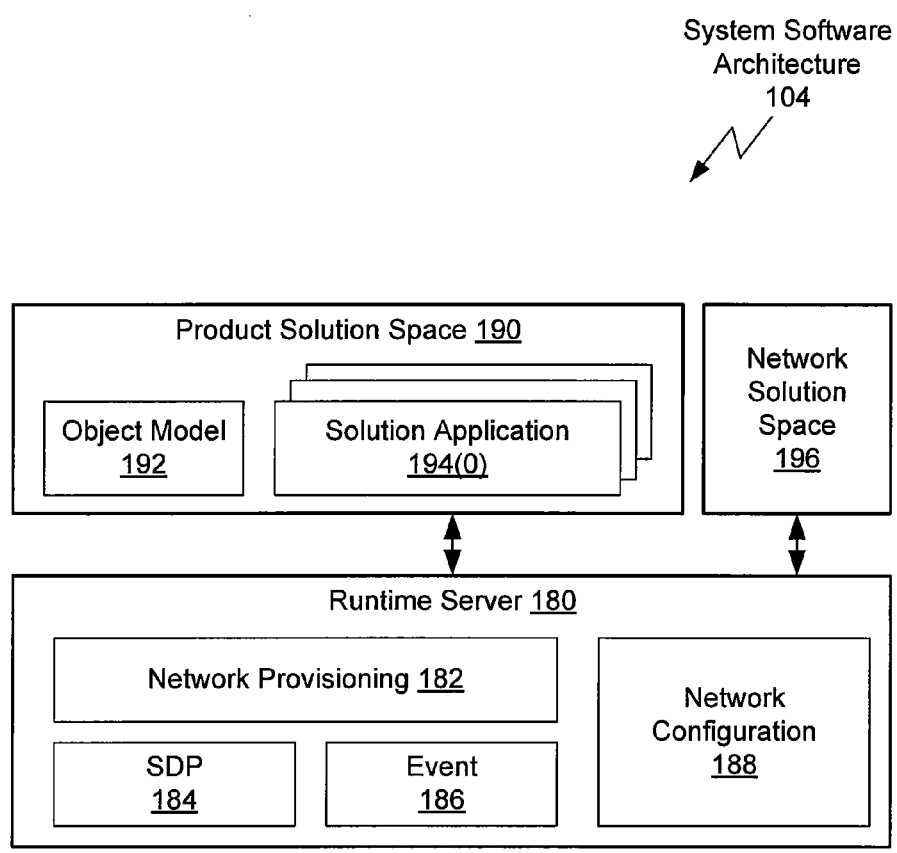
FIG. 1F illustrates a system software architecture for the smart network host device of FIG. 1E, according to one example embodiment of the present invention.

FIG. 1F illustrates a system software architecture 104 for the smart network host device 120, according to one embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

Figure 2:
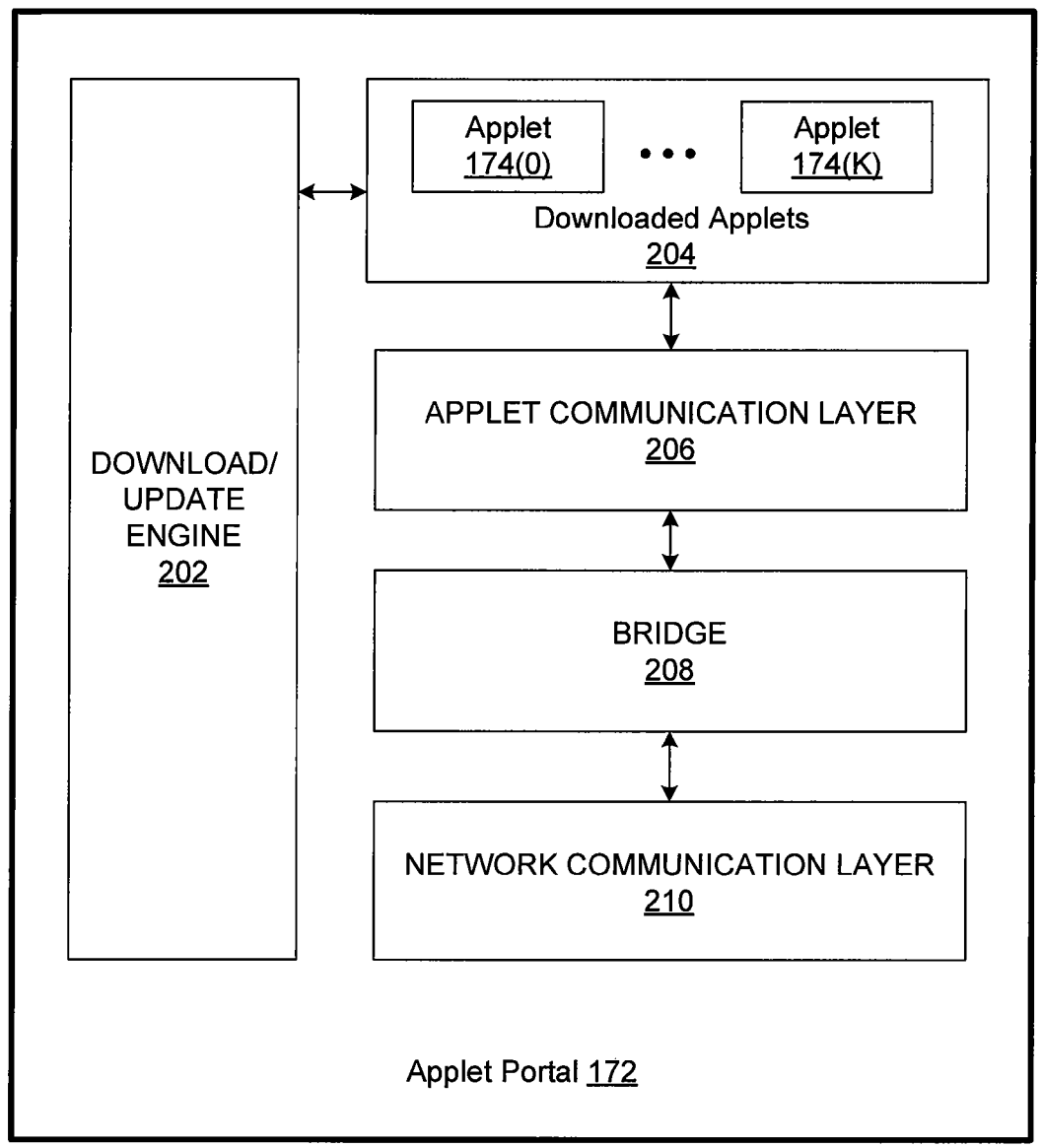
FIG. 2 illustrates a more detailed view of the applet portal application of FIG. 1A, according to one example embodiment of the present invention.

FIG. 2 illustrates a more detailed view of the applet portal application 172 of FIG. 1A, according to one example embodiment of the present invention. As shown, the applet portal application 172 includes a download/update engine 202, downloaded applets 204, an applet communication layer 206, a bridge 208 and a network communication layer 210.

As previously described herein, applets 174 published within the applet store 116 can be downloaded to the computer 170 for execution. An applet 174 can be a device applet or a service applet. A device applet is configured to display information about and/or provide logic to configure a particular client device 130. A service applet is configured to provide, to a user, additional functionality built on top of the smart network 102. Each applet 174 is packaged with a set of rules that must be satisfied within the smart network 102 for the applet 174 to function as desired.

In operation, the download/update engine 202 automatically downloads applets 174 from the application store 116 as the need arises. For example, when a new client device 130 is connected to the smart network 102, the download/update engine 202 receives an indication from the smart network host device 120 that the client device 130 has been connected. Other triggers may include a client device 130 coming online, a routine applet download/update task or a new applet 174 becoming available within the applet store 116. In response, the download/update engine 202 downloads any applets 174 related to the newly connected client device 130. The downloaded applets 174 may include a device applet that configures the newly connected client device 130 within the smart network 102 and any service applets that utilize the newly connected client device 130.

To identify which applets 174 are to be downloaded, the download/update engine 202 accesses the network state model maintained by the smart network host device 120. Based on the network state model, the download/update engine 202 identifies applets 174 that are related to the client devices 130 within the smart network 102. In one case, there may be a 1-to-1 relationship between a particular client device 130 and a particular applet 174, for example a device applet associated with the client device. In other cases, if the smart network 102 includes a particular combination of client devices 130, then the download/update engine 202 may download an applet 174 that utilizes the combination of the client devices 130. In one embodiment, an applet 174 specifies a set of rules that should be satisfied by the smart network 102 for the applet 174 to operate correctly. Such rules may include delineating particular client devices 130 that must be within the smart network 102 for the applet 174.

The download/update engine 202 keeps track of the different applets that have been downloaded, i.e., the downloaded applets 204. If an update is available in the applet store 116 of one of the downloaded applets 204, the download/update engine 202 automatically downloads the updated applet from the applet store 116. Another trigger to the automatic update of a downloaded applet 204 occurs when a client device 130 associated with the downloaded applet 204 is connected/reconnected to the client device 130, and the download/update engine 202 determines the status of each applet associated with the client device 130. In such a case, if a downloaded applet 204 requires an update, then the download/update engine 202 downloads the updates from the applet store 116.

A downloaded applet 204 executes within the applet portal application 172 to interact with the corresponding client devices 130. The downloaded applet 204 is, typically, a lightweight application from which the lower-level network model details and communications are abstracted by the applet portal application 172. In addition, interactions with system resources provided by the computer 170 that are needed to execute the downloaded applet 204 are also abstracted from the downloaded applet 204 by the applet portal application 172.

As previously described herein, the different client devices 130 within the smart network 102 expose services. Each service is defined via a particular service definition that specifies a set of actions that can be performed on the associated client device 130. The services exposed by the client devices 130 enable the interaction between a particular client device 130 and a downloaded applet 204.

In operation, the applet portal application 172 hosts a web browser control (not shown) that operates as an execution container for a particular downloaded applet 204 that is currently loaded. To load the downloaded applet 204, the applet portal application 172 injects the applet communication layer 206 and the bridge 208 into the context of the web browser control. The applet communication layer 206 exposes a set of high-level application program interfaces (APIs) that allow the downloaded applet 204 to communicate with the system resources of the computer 170 as well as the smart network host device 120 and the corresponding client devices 130 in an intuitive manner. The applet communication layer 206 wraps the bridge 208, such that APIs exposed by the applet communication layer 206 internally call into the methods exposed by the bridge 208.

The bridge 208 provides an interface between the applet communication layer 206 and the network communication layer 210. The bridge 208 exposes methods to the applet communication layer 206 that allow the downloaded applet 204 to invoke pre-defined actions on the corresponding client devices 130, subscribe to and unsubscribe from events that can be raised within the smart network 102, etc. These methods, when executed, call on underlying functions provided by the network communication layer 210 to interact with the smart network 102. In addition, the bridge 208 exposes methods that, when executed, allow the applet 204 to interact with an operating system (not sown) executing within the computer 170 to access system-level resources, such as a file system, network input/output, etc.

The network communication layer 210 is configured with logic that enables the communication between the client devices 130 specified by the bridge 208 via the smart network host. The network communication layer 210 also enables the downloaded applet 204 to interact with the smart network host device 120. For example, the network communication layer 210 can embody a security model related to the smart network host device 120 to allow or disallow commands and requests that can be transmitted to devices within the smart network 102. In one embodiment, the network communication layer 210 is separate from the applet portal 172 to provide services to external callers regardless of whether the applet portal 172 is executing. In such an embodiment, requests to the applet portal 172 can be queued via the separately executing network communication layer 210 when the applet portal 172 is not executing.

In one embodiment, the downloaded applet 204 and the applet communication layer 206 are implemented in Javascript, the network communication layer 210 is implemented in C++, and the bridge 208 provides an interface between the Javascript layer and the C++ layer.

In such a manner, the downloaded applet 204, via the tri-layered execution environment, i.e., the applet communication layer 206, the bridge 208, and the network communication layer 210, can interact with the different client devices 130 within the smart network 102. For example, the downloaded applet 204 can retrieve information about the client devices 130 within the smart network 102, perform actions on the client devices 130 and subscribe to any relevant alerts/events within the smart network 102. Based on the interactions, the downloaded applet 204 can either configure the corresponding client devices 130 to operate as desired, or provide additional functionality to a user that is built on top of the various services exposed by the corresponding client devices 130.

Figure 3:
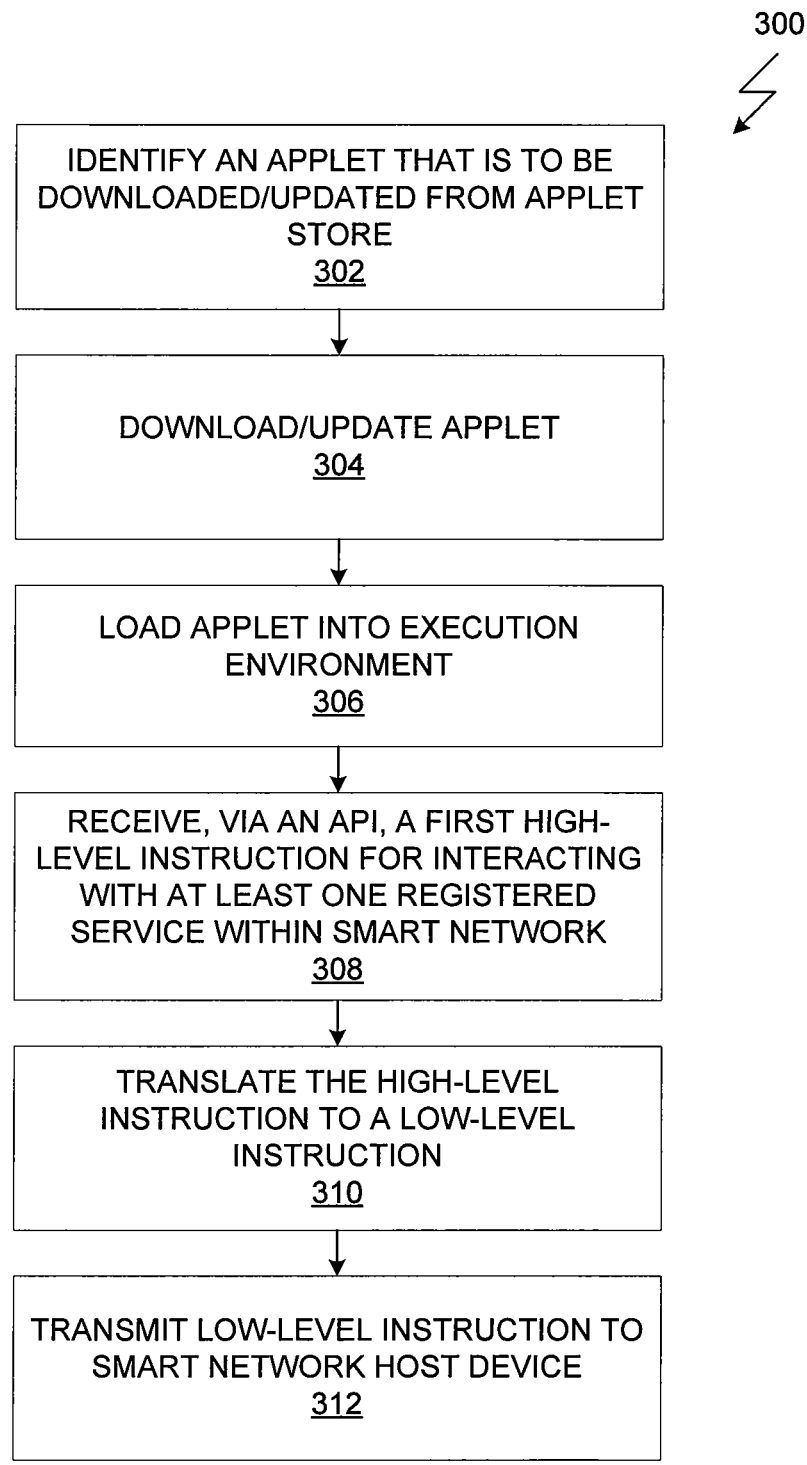
FIG. 3 is a flow diagram of method steps for interacting with at least one client device within the home network via the applet portal application, according to one embodiment of the present invention.

FIG. 3 is a flow diagram of method steps for interacting with at least one client device within the home network via the applet portal application, according to one embodiment of the present invention. Although the method steps are described in conjunction with the system for FIG. 1-2, persons skilled in the art will understand that any system configured to perform the method steps, in any order, is within the scope of the invention.

In one embodiment, after a period of time during which a particular client device 130 is no longer available within the smart network 102, a corresponding downloaded applet 204 may be automatically removed. For example, if the downloaded applet 204 was downloaded because a printer was added to the smart network 102, the downloaded applet 204 may be removed from the after a certain amount of time has elapsed during which the printer was not present within the smart network 102. In operation, when a downloaded applet 204 is first installed, the downloaded applet 204 is marked as "active." When a corresponding device, such as the printer, is removed from the smart network 102, the downloaded applet 204 is marked as "orphaned," and the time at which the downloaded applet 204 was first orphaned is stored. Any applet which has is marked as orphaned, and the orphaning date is older than a pre-determined period of time is subject to removal and is considered as "expired". A periodic cleanup process locates expired applets and deletes those applets from the applet portal 172.

The method 300 begins at step 302, where the download/update engine 202 identifies at least one applet 174 that is to be downloaded or updated. The identification of the at least one applet 174 may be triggered by a new client device 130 being added to the smart network 102, a client device 130 coming online, a routine applet download/update task or a new applet 174 becoming available within the applet store 116.

At step 304, the identified applet 174 is downloaded to the computer 170 and stored within the downloaded applets 204. In the case of an applet update, the relevant applet 174 within the downloaded applets 204 is updated based on the updated applet retrieved from the applet store 116.

At step 306, a particular downloaded applet 204 is selected for execution and loaded into the execution environment of the applet portal application 172. To load the applet 174, the applet portal application 172 injects the applet communication layer 206 and the bridge 208 into the context of the web browser control, as previously described herein.

At step 308, the applet communication layer 206 receives, via an API, a first high-level instruction for interacting with at least one registered service associated with a client device 130 or particular client device 130 from the downloaded applet 204. At step 310, the high-level instruction is processed within the bridge 208 and the network communication layer 210 and is translated to the low-level instruction that can be processed by the smart network host device 120 or the particular client device 130.

At step 312, the low-level instruction is transmitted to the smart network host device 120 or the particular client device 130 for further processing.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method, comprising:

identifying a first application that is associated with at least one service registered in a smart home network, wherein the first application is stored in a first application store coupled to the smart home network, wherein identifying the first application comprises determining that the smart home network satisfies a set of rules associated with the first application, and wherein the set of rules specifies that a client device associated with a first type should be present in the smart home network, and determining that the smart home network satisfies the set of rules comprises analyzing a network model that represents the smart home network and is maintained by a smart home network host device located within the smart home network to determine that the at least one client device is associated with the first type;

downloading the first application from the first application store for execution;

associating a service provided by the at least one client device with the first application;

translating a high-level instruction generated by the first application to a low-level instruction that is understood by the at least one client device; and transmitting the low-level instruction to the at least one client device for processing.

2. The method of claim 1, wherein identifying the first application comprises detecting a type associated with the at least one client device;

and identifying the first application based on the type.

3. The method of claim 1, further comprising determining that the first application has been updated in the first application store, and downloading the updated first application from the first application store for execution.

4. The method of claim 1, wherein the at least one client device specifies the service via a service definition that delineates one or more actions that can be performed on the at least one client device, and wherein the low-level instruction, when processed by the at least one client device, invokes at least one of the one or more actions.

5. The method of claim 1, further comprising registering an event that is specified by the at least one client device with the first application, and transmitting an alert to the first application when the event is raised by the at least one client device.

6. The method of claim 1, wherein the low-level instruction is transmitted to the at least one client device via a smart home network host device.

7. The method of claim 1, further comprising providing an abstraction layer though which the first application interacts within one or more low-level components of the smart home network.

8. The method of claim 1, wherein the first application is configured to manage the operations of the at least one client device within the smart home network.

9. A non-transitory computer-readable medium storing instructions that, when executed by a processing unit, cause the processing unit to perform the steps of:

identifying a first application that is associated with at least one service registered in a smart home network, wherein the first application is stored in a first application store coupled to the smart home network, the at least one registered service being a service provided by at least one client device;

downloading the first application from the first application store for execution;

associating the service provided by the at least one client device with the first application;

translating a high-level instruction generated by the first application to a low-level instruction that is understood by the at least one client device; and transmitting the low-level instruction to the at least one client device for processing.

10. The computer-readable medium of claim 9, wherein identifying the first application comprises detecting a type associated with the at least one client device; and identifying the first application based on the type.

11. The computer-readable medium of claim 9, wherein identifying the first application comprises determining that the smart home network satisfies a set of rules associated with the first application.

12. The computer-readable medium of claim 11, wherein the set of rules specifies that a client device associated with a first type should be present in the smart home network, and determining that the smart home network satisfies the set of rules comprises analyzing a network model that represents the smart home network and is maintained by a smart home network host device located within the smart home network to determine that the at least one client device is associated with the first type.

13. The computer-readable medium of claim 9, further comprising determining that the first application has been updated in the first application store, and downloading the updated first application from the first application store for execution.

14. The computer-readable medium of claim 9, wherein the at least one client device specifies the service via a service definition that delineates one or more actions that can be performed on the at least one client device, and wherein the low-level instruction, when processed by the at least one client device, invokes at least one of the one or more actions.

15. The computer-readable medium of claim 9, further comprising registering an event that is specified by the at least one client device with the first application, and transmitting an alert to the first application when the event is raised by the at least one client device.

16. The computer-readable medium of claim 9, wherein the low-level instruction is transmitted to the at least one client device via a smart home network host device.

17. The computer-readable medium of claim 9, further comprising providing an abstraction layer though which the first application interacts within one or more low-level components of the smart home network.

18. The computer-readable medium of claim 9, wherein the first application is configured to manage the operations of the at least one client device within the smart home network.

19. A system, comprising:

a host computer that includes a portal application configured to:

identify a first application that is associated with at least one service registered in a smart home network, wherein the first application is stored in a first application store coupled to the smart home network, the at least one registered service being a service provided by at least one client device;

download the first application from the first application store for execution;

associate the service provided by the at least one client device with the first application;

translate a high-level instruction generated by the first application to a low-level instruction that is understood by the at least one client device; and transmit the low-level instruction to the at least one client device for processing.

* * * * *